US 7,836,608 B2

(12) United States Patent
Greene

(10) Patent No.: US 7,836,608 B2
(45) Date of Patent: *Nov. 23, 2010

(54) ARTICLE OF FOOTWEAR FORMED OF MULTIPLE LINKS

(75) Inventor: Pamela S. Greene, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 887 days.

This patent is subject to a terminal disclaimer.

(21) Appl. No.: 11/005,153

(22) Filed: Dec. 6, 2004

(65) Prior Publication Data
US 2006/0117600 A1 Jun. 8, 2006

(51) Int. Cl.
*A43B 5/00* (2006.01)
*A31D 3/02* (2006.01)

(52) U.S. Cl. ............... 36/3 A; 36/45; 36/102; 36/8.1; 428/12; 428/53

(58) Field of Classification Search ............ 36/45, 36/8.1, 3 A, 3 B, 3 R, 102, 9 R; 428/12, 428/53, 131, 138
See application file for complete search history.

(56) References Cited

U.S. PATENT DOCUMENTS

| | | | |
|---|---|---|---|
| 2,577,350 A | 12/1951 | Morin | |
| 2,596,188 A * | 5/1952 | Webb | 36/11.5 |
| 2,752,636 A | 7/1956 | Morin | |
| 2,829,402 A | 4/1958 | Morin | |
| 3,262,549 A | 7/1966 | Stewart et al. | 198/178 |
| 3,647,505 A | 3/1972 | Bjorn-Larsen | 117/37 R |
| 3,676,940 A * | 7/1972 | Shively | 36/8.1 |
| 3,870,141 A | 3/1975 | Lapeyre et al. | 198/193 |
| 3,952,351 A * | 4/1976 | Gisbert | 441/64 |
| D247,527 S * | 3/1978 | Foldes | D2/926 |
| 4,265,032 A * | 5/1981 | Levine | 36/11.5 |
| 4,267,648 A * | 5/1981 | Weisz | 36/28 |
| 4,283,864 A * | 8/1981 | Lipfert | 36/28 |
| 4,707,934 A * | 11/1987 | Hart | 36/7.8 |
| 4,922,986 A | 5/1990 | Leibowitz | 160/178.1 |
| 5,096,335 A | 3/1992 | Anderson et al. | 405/288 |
| 5,139,135 A | 8/1992 | Irwin et al. | |
| 5,215,185 A | 6/1993 | Counter et al. | 198/853 |
| 5,266,062 A * | 11/1993 | Runckel | 441/64 |
| 5,964,340 A | 10/1999 | Dolan | 198/853 |
| 6,696,003 B2 | 2/2004 | Cediel et al. | 264/255 |

(Continued)

FOREIGN PATENT DOCUMENTS

CH 174 340 1/1935

(Continued)

OTHER PUBLICATIONS

International Search Report for PCT/US2005/044196, Apr. 25, 2006.

(Continued)

*Primary Examiner*—Jila M Mohandesi
(74) *Attorney, Agent, or Firm*—Banner & Witcoff, Ltd.

(57) ABSTRACT

An article of footwear includes a frame having a plurality of elongate members formed of a first polymer. A plurality of links is formed of a second polymer, with a portion of each link co-molded about a portion of at least one elongate member, and at least one link movable with respect to a corresponding elongate member.

59 Claims, 9 Drawing Sheets

U.S. PATENT DOCUMENTS

| | | | |
|---|---|---|---|
| 6,763,611 B1 * | 7/2004 | Fusco | 36/28 |
| 2002/0012784 A1 | 1/2002 | Norton | |
| 2004/0074108 A1 * | 4/2004 | Shikhashvili | 36/8.1 |

FOREIGN PATENT DOCUMENTS

| | | |
|---|---|---|
| CN | 2107190 U | 6/1992 |
| EP | 0 089 930 | 9/1983 |
| FR | 880 378 | 3/1943 |
| FR | 891 827 | 3/1944 |
| FR | 896 838 | 3/1945 |
| WO | WO 2005/009162 | 2/2005 |

OTHER PUBLICATIONS

Office Action issued Sep. 18, 2009 in corresponding Chinese Patent Application No. 200580046804.4, and English translation thereof.

Office Action issued Feb. 12, 2010 in corresponding Chinese Patent Application No. 200580046804.4, and English translation thereof.

* cited by examiner

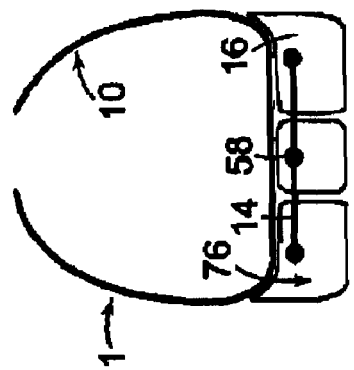
FIG. 19
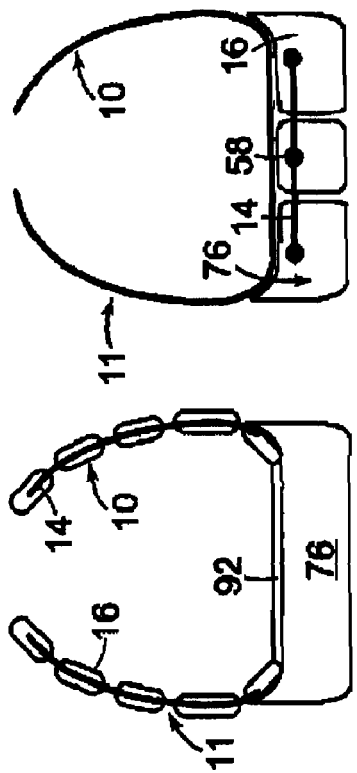
FIG. 18
FIG. 17
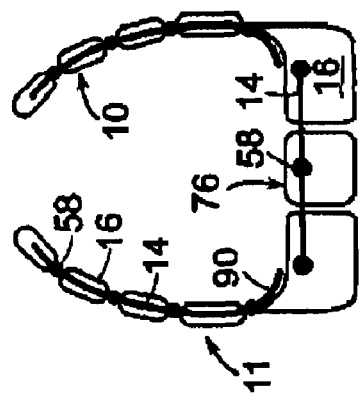
FIG. 16
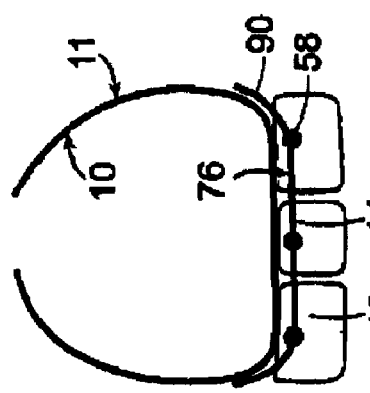

ARTICLE OF FOOTWEAR FORMED OF MULTIPLE LINKS

FIELD OF THE INVENTION

This invention relates generally to an article of footwear, and more particularly, to an article of footwear formed of a polymer frame and multiple polymer links co-molded with the frame and pivotable and movable about the frame.

BACKGROUND OF THE INVENTION

The human foot is an organic shape composed of a series of complex curves and surface irregularities that change position and dimension in dynamic motion. The anatomical variation of shape and volume of the human foot naturally differs widely from individual to individual. In addition, either foot of a given individual may vary in size and shape from the other foot.

Solid leather shoes often lack conformable and flexible qualities to accommodate the inherent shape and size variations of the foot. Historically, to overcome the limitations of making footwear with relatively unforgiving layered sheets of material, shoes have been woven with strips of leather, plant material or textile. Makers of footwear often utilize textile and stretch textile uppers for the purposes of providing conformable and flexible qualities. Shoes made in this way provide breathability as well, since the non-solid upper has ventilation apertures formed by the gaps between the yarns or strips.

In unrestricted woven materials, the strips move freely and shift in relation to each other. The spaces between the strips are therefore variable, and provide conformability and flexibility by shifting alignment in relation to anatomical features or exerted pressure. Articles of footwear produced with woven materials are labor intensive and therefore expensive to create. Additionally, the edges of woven materials have difficult to solve un-raveling issues when used in cut and sew applications.

Another way to create a flexible, conformable material out of a relatively inflexible starting material is through the interlocking of small individual elements often referred to as links. Links joined together with linear connecting pins, such as those used in metal watchbands, have flexibility along the axis of rotation (pivot point) of the pins. Multiple links threaded together with a connector such as string, wire or elastic can create large flexible expanses of material. Creating linked or beaded material through the process of individually threading each element is time consuming and therefore not cost effective for mass production purposes.

It would be desirable to provide a functional material that is ventilated, flexible, conformable, and has adjustable attributes, without the labor and associated cost of threading the individual elements or weaving individual strips.

It is an object of the present invention to provide an article of footwear that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a multi-polymer material providing ventilated, flexible, conformable, and adjustable attributes that can advantageously be used within an article of footwear. Preferred embodiments of the present invention rely upon the incompatible chemistries of two injected polymers to form a frame and links to produce an article of footwear formed of the frame and links in a non-bonded state. This bonding incompatibility allows a series of links to rotationally pivot, shift and slide independently of one another along the frame, and thus saves in the labor and difficulty of threading individual links onto a frame matrix. This process creates a material that is flexible and conformable to organically shaped surfaces. The injected polymers and shrinkage rates, as well as the geometry, size and spacing of component parts can be optimized to provide comfort and meet dynamic performance objectives.

In accordance with one preferred embodiment, an article of footwear includes a frame having a plurality of elongate members formed of a first polymer. A plurality of links is formed of a second polymer, with a portion of each link co-molded about a portion of at least one elongate member, and at least one link movable with respect to a corresponding elongate member In accordance with another preferred embodiment, an article of footwear includes a frame having a plurality of elongate members formed of a first polymer. At least one elongate member includes a plurality of nubs spaced from one another along the elongate member. A plurality of links is formed of a second polymer. The first and second polymers are capable of being co-molded without bonding to one another. A portion of each link is co-molded about a portion of at least one elongate member. At least one link includes a recess with an end of an elongate member being received in each recess. At least one link includes an aperture with an elongate member extending through each aperture.

In accordance with yet another preferred embodiment, an article of footwear includes an upper having a frame comprising a first plurality of elongate members formed of a first polymer. Elongate members in a forefoot region of the upper are curved and substantially parallel to one another. Elongate members in a medial midfoot and heel region of the upper are substantially parallel to one another. Elongate members in a lateral midfoot and heel region of the upper are substantially parallel to one another. A first plurality of links is formed of a second polymer, with the first and second polymers are capable of being co-molded without bonding to one another. A portion of each link of the first plurality of links is co-molded about a portion of at least one elongate member of the frame of the upper. A sole assembly includes a frame having a second plurality of elongate members formed of a first polymer, with the elongate members of the second plurality extending substantially parallel to one another transversely across the sole assembly, and a second plurality of links formed of a second polymer. The first and second polymers are capable of being co-molded without bonding to one another, with a portion of each link of the second plurality of links co-molded about a portion of at least one elongate member of the frame of the sole assembly. At least one of the second plurality of links is secured to one of the plurality of links of the upper.

In accordance with a further embodiment, an article of footwear includes an upper having a frame comprising a first plurality of elongate members formed of a first polymer. Elongate members in a forefoot region of the upper are curved and substantially parallel to one another. Elongate members in a medial midfoot and heel region of the upper are substantially parallel to one another, and elongate members in a lateral midfoot and heel region of the upper are substantially parallel to one another. A first plurality of links is formed of a second polymer, with the first and second polymers capable of being co-molded without bonding to one another. A portion of each link of the first plurality of links is co-molded about a portion of at least one elongate member of the frame of the upper. Each of a plurality of plates is secured to one or more links of the first plurality of links. A sole assembly includes a frame having a second plurality of elongate members formed of a first polymer, with the elongate members of the second plurality extending substantially parallel to one another transversely across the sole assembly. A second plurality of links is formed of a second polymer, with the first and second polymers capable of being co-molded without bonding to one another. A portion of each link of the second plurality of links is co-molded about a portion of at least one elongate member of the frame of the sole assembly, with at least one of the second plurality of links being secured to one of the plurality of links of the upper.

In accordance with still yet another embodiment, an article of footwear includes a frame comprising a plurality of elongate members formed of a first material and a plurality of links formed of a second material. The first and second materials are capable of being co-molded without bonding to one another, with a portion of each link co-molded about a portion of at least one elongate member.

Substantial advantage is achieved by providing an article of footwear formed of multiple links mounted on a frame. The fact that the parts can be injected substantially flat, and will upon assembly and use conform to 3-dimensional positions provides manufacturing cost reductions and mold cost savings as compared to traditional injection molded footwear and traditional stitch and sew footwear. Since the parts can be engineered with a specific pop-up geometry from a flat orientation, there is no need to provide complicated injection molds with multiple plates and slides to achieve the necessary compound curvatures to cover the foot.

These and additional features and advantages of the invention disclosed here will be further understood from the following detailed disclosure of certain preferred embodiments.

BRIEF DESCRIPTION OF THE DRAWINGS

FIG. 16 is a section view of an alternative embodiment of the article of footwear of FIG. 11.

FIG. 17 is a section view of another alternative embodiment of the article of footwear of FIG. 11.

FIG. 18 is a section view of a further alternative embodiment of the article of footwear of FIG. 11.

FIG. 19 is a section view of yet another alternative embodiment of the article of footwear of FIG. 11.

Figure 1:
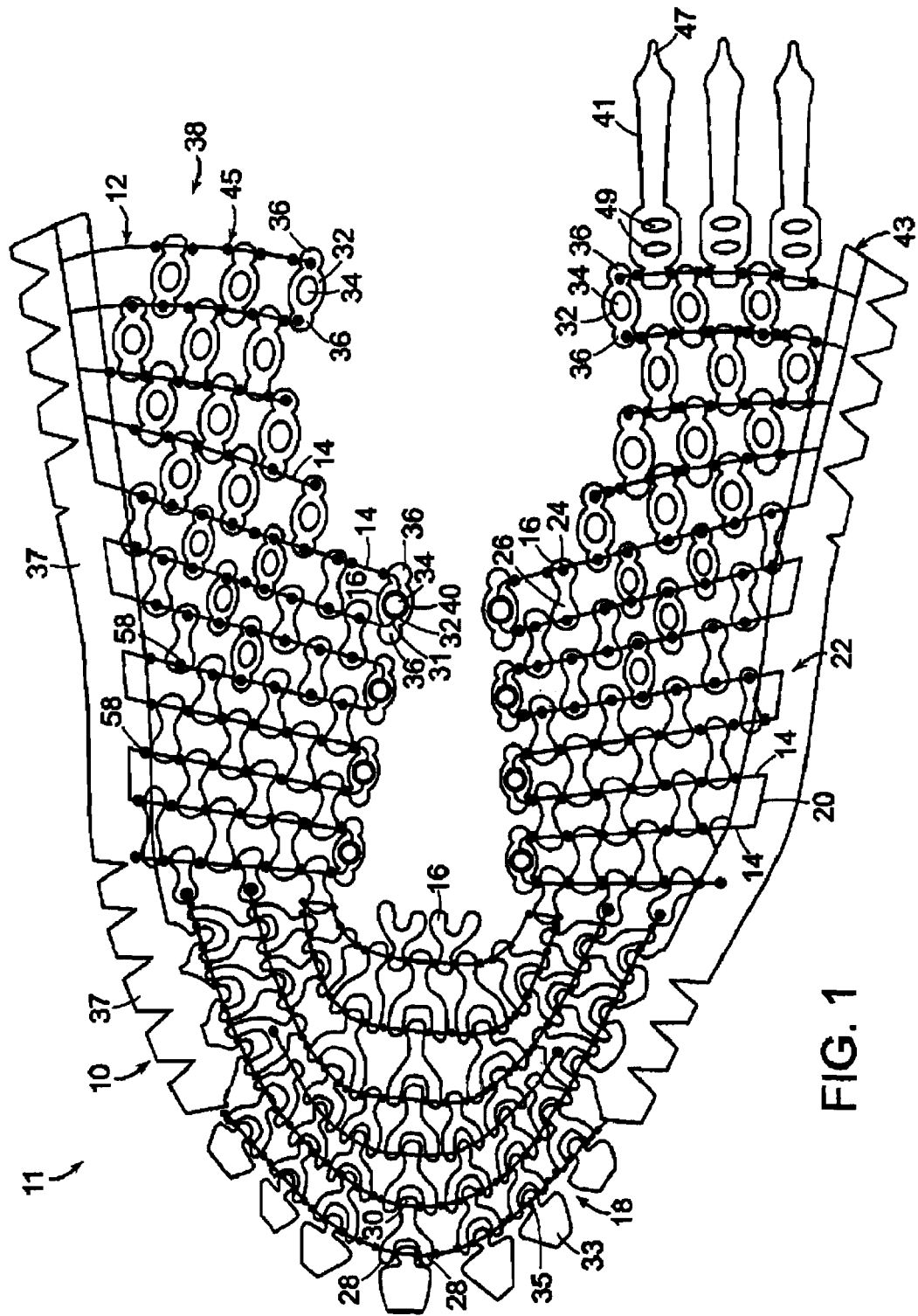
FIG. 1 is a plan view of an upper of an article of footwear in accordance with a preferred embodiment of the present invention, shown in a substantially flat orientation.

The figures referred to above are not drawn necessarily to scale and should be understood to provide a representation of the invention, illustrative of the principles involved. Some features of the article of footwear formed of multiple links depicted in the drawings have been enlarged or distorted relative to others to facilitate explanation and understanding. The same reference numbers are used in the drawings for similar or identical components and features shown in various alternative embodiments. Articles of footwear formed of multiple links as disclosed herein would have configurations and components determined, in part, by the intended application and environment in which they are used.

DETAILED DESCRIPTION OF CERTAIN PREFERRED EMBODIMENTS

Figure 2:
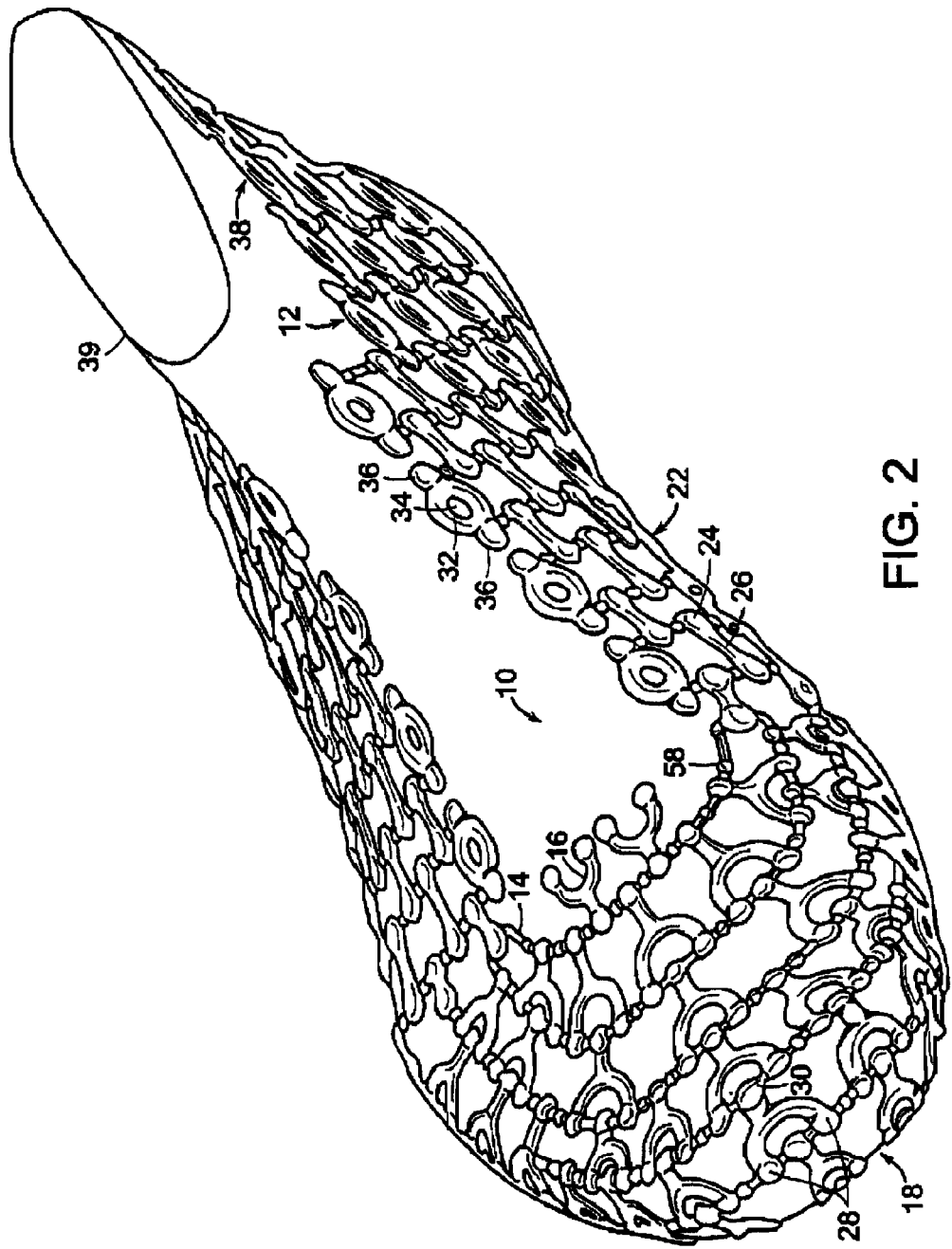
FIG. 2 is a perspective view of the upper of FIG. 1, shown on a last.

The present invention may be embodied in various forms. A preferred embodiment of an upper 10 of an article of footwear 11 is shown in FIGS. 1-2. Upper 10 is formed of a frame 12 comprising a plurality of elongate members 14. A plurality of links 16 is secured to frame 12. Elongate members 14 are formed of a first polymer while links 16 are formed of a second polymer. The sole assembly of footwear 11 is not shown in this figure, however, its construction may be similar to that of upper 10 and comprise a plurality of links 16 secured to a frame 12. A sole assembly is illustrated and discussed below in connection with FIG. 11. In other embodiments, upper 10 could be secured to a conventional sole assembly.

Frame 12 is preferably formed of a resilient polymer having a high tensile strength, e.g., at least approximately 6,000 PSI. In a preferred embodiment, the Modulus of Elasticity of the first polymer forming frame 12 is approximately 50,000

PSI to 800,000 PSI. The first polymer may be, for example, polyamide (Nylon), polyamide co-polymers, thermoplastic urethanes, thermoplastic polyesters, polyester copolymers, nanofilled nylons, nanofilled polyesters, or polyolefins. Links 16 are preferably formed of a resilient polymer having a soft tactile feel and a high tensile strength, e.g., at least approximately 500 PSI, and a low hysterisis loss. The Shore hardness of the second polymer forming links 16 is approximately 35 A to 70 D. The second polymer may be, for example, thermoplastic copolyesters, impact modified polyolefins, thermoplastic urethanes, elastomeric polyamides or other thermoplastic elastomeric chemistries such as styrene butadiene styrene (SBS) or ethylene modified (SEBS). In the case of using the links as a sole assembly, the same polymers listed could be converted into injectable thermoplastic foams with the addition of physical or chemical blowing agents or by utilizing gas assisted molding processes.

In certain embodiments, the second polymer may be rigid or semi-rigid, non-stretchable and not elastomeric. Such an embodiment may be useful in forming a watchband, for example. In cases where strength or rigidity is required of the links, the Modulus of Elasticity of the second polymer may be approximately 50,000 PSI to 800,000 PSI. In this case, the second polymer may be for example thermoplastic polyester, thermoplastic polyurethanes, thermoplastic polyamides, thermoplastic polypropylenes, thermoplastic polyethylenes, or other thermoplastic materials. It is to be appreciated that the materials listed, or other thermoplastic materials must be chosen for their inability to bond to, or must be modified to prohibit bonding to the material selected for the frame.

In preferred embodiments, the first and second polymers are different from one another, and have an incompatible chemistry that allows them to be co-molded without bonding to one another. In one preferred embodiment, frame 12 and links 16 are formed by multi-shot injection molding. Multi-shot injection molding is a process whereby two or more injection shots of polymers are co-joined, with one material being shot onto the first. The process involves molding at least two dissimilar colors or compounds into at least two separate cavities. Thus, for example, the first polymer for frame 12 is shot into a first mold cavity, and then the second polymer for links 16 is shot into a second mold cavity that contains the frame. The dissimilar polymer compounds will not bond to one another, allowing them to move with respect to one another once they have set. Thus, links 16 are free to rotationally pivot, shift and slide independently of one another and otherwise move along frame 12, allowing a user to customize or modify the article of footwear to a desired shape.

In certain preferred embodiments, a spray release may be applied to frame 12 prior to the second polymer for links 16 being shot into the second mold cavity, enhancing the ability of links 16 to move with respect to frame 12 and to help prevent bonding of the two polymers.

In other embodiments, chemical lubricants, e.g., silicone based lubricants, halogenated additives, and waxes, may be added to either or both of the first and second polymers to facilitate movement of links 16 with respect to frame 12 and to help prevent bonding of the two polymers.

In certain preferred embodiments, links 16 may be formed of two or more different and compatible materials, e.g., compatible polymers. Similarly, elongate members 14 may be formed of a combination of two or more materials, e.g., compatible polymers.

As noted above, frame 12 is formed of a plurality of elongate members 14. Elongate members 14 may be, as illustrated in some embodiments here, cylindrical in cross-section. However, elongate members 14 may have any desired cross-section. It is to be appreciated that in certain preferred embodiments, or in certain regions of upper 10, elongate members 14 may be separate elements spaced from one another, as seen in the forefoot region 18 of upper 10. As seen here in forefoot region 18, frame 12 includes a plurality of elongate members 14 that are substantially parallel to one another and curve outwardly toward the forward-most portion of forefoot region 18.

In other embodiments, or in other regions of upper 10 as illustrated here, elongate members 14 may be connected to one another by elongate transverse members 20, as seen in the midfoot region 22 of upper 10. In a preferred embodiment, elongate transverse members 20 are of unitary, that is, one-piece construction with elongate members 14. Such a construction may ease injection flow and provide increased strength for anchoring upper 10 to the sole assembly. As seen here in midfoot region 22 and heel region 38, a plurality of substantially straight elongate members 14 are spaced from one another in substantially parallel lines.

It is to be appreciated that frame 12 of upper 10 may be formed of a plurality of independent and separate elongate members 14. In such a configuration, upper 10 is held together solely by the connection between elongate members 14 and links 16. Alternatively, some or all of the elongate members 14 may be connected to one another, such as by elongate transverse members 20.

Links 16 can have a variety of shapes. For example, as seen in midfoot region 22 of upper 10, links 16 may have a figure eight, or barbell shape, having end portions 24 that are generally spherical in shape joined by a reduced thickness central or necked portion 26.

Other links 16 are substantially Y-shaped, as seen in the forefoot region 18 of upper 10. Some of the Y-shaped links 16 may have an elongate member 14 passing through each arm 28 and the base 30 of the Y-shape, preferably proximate the ends of each of arms 28 and base 30. The Y-shaped links 16 serve to accommodate the curvature of elongate members 14 in forefoot region 18 of upper 10, with the arms of the Y-shape pointing toward the toe of forefoot region 18. The Y-shaped links 16 provide a greater amount of material of each link 16 on the elongate members 14 that have a greater radius with a smaller amount of material of each link 16 provided on the elongate members with a smaller radius, thus minimizing crowding of links 16 on the elongate members 14 with a smaller radius. This same effect can be realized with other shapes having a smaller amount of material on one side of the link including, for example, a trident shape.

Yet other links 16 may have an oval or circular central section 32 defining a central aperture 34, and tabs 36 formed on opposed sides of central section 32, as seen in a heel region 38 of upper 10. Such links 16 may provide additional strength due to their larger size, while reducing weight due to apertures 34. Some of these types of links 16 may be provided in midfoot region 22 at upper edges of upper 10, and serve as eyelet links that receive laces (not shown) for a user to secure upper 10 when the article of footwear is on the user's foot. In a preferred embodiment, transverse members 31 that connect respective ends of elongate members 14 may extend through the eyelet links 16 and may include an oval or circular segment 40 contained within central section 32. Circular segment 40 serves to reinforce eyelet links 16, providing additional strength for laces, straps, or other fasteners or closure members for footwear 11. It is to be appreciated that any link 16 can be reinforced by extending a portion of an elongate member 14 through a portion of a link 16. Thus, for example, a fastener could be secured to footwear 11 at any location.

Certain links 16 about the periphery of upper 10 serve as flanges that allow upper 10 to be secured to a sole assembly. In a preferred embodiment, links 16 about the periphery of forefoot region 18 of upper 10 include tabs 33 extending outwardly from a base portion 35 through which an elongate member 14 extends. In a preferred embodiment, an extended link 16 is provided along the length of midfoot region 22 and heel region 38 of upper 10 on both the lateral and medial sides, with a plurality of tabs 37 extending outwardly therefrom. Tabs 37 may have any of a number of configurations and sizes. Tabs 33 and 37 may be secured to corresponding tabs or flanges on the sole assembly by stitching, adhesive, welding or any other suitable fastening means.

Upper 10, as seen in FIG. 1, may be formed in a flat configuration and then manipulated to form the complex shape necessary to conform to the instep ankle and heel of a user's foot. Upper 10 is seen in FIG. 2, wrapped about a last 39. Heel region 38 is wrapped about last 39 and secured to itself with one or more fasteners 41, seen in FIG. 1. As illustrated here, fasteners 41 are elongate members having one end anchored to a lateral side 43 of upper 10. When heel region 38 is wrapped about last 39, fasteners 41 are looped through frame 12 on medial side 45 of upper 10. Ends 47 of fasteners 41 are then looped through apertures 43 formed in fasteners 41 in known fashion to secure fastener 41 about last 39 in proper position. It is to be appreciated that fasteners 41 may have any desired configuration. For example, fasteners 41 could include hook and loop fastening elements or male/female snap-fit elements. Additionally, one or more fasteners 41 could be provided on medial side 45, or one or more fasteners could be provided on medial side 45 with one or more additional fasteners 41 provided on lateral side 43. It is to be appreciated that in certain embodiments, fasteners 41 can be constructed to be adjustable by the user, while in other embodiments fasteners 41 can be constructed so as to be permanently fixed in a predetermined position during the manufacturing process.

Figure 3:
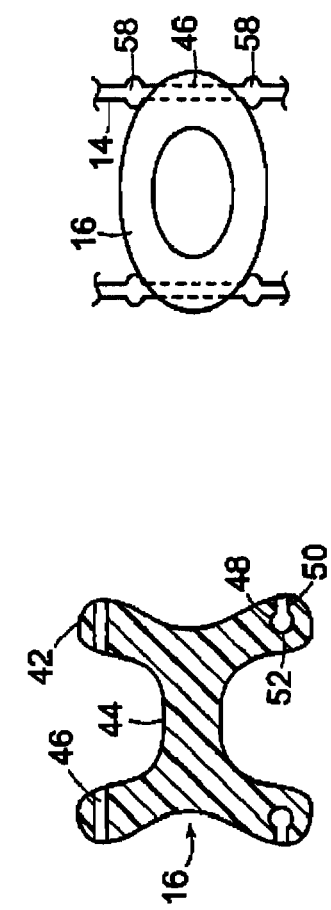
FIG. 3 is a section view of an embodiment of a link of the upper of FIG. 1.

Another shape for link 16 is illustrated in FIG. 3 (link 16 is illustrated here in cross-section without the corresponding elongate members 14 for clarity purposes), in which link 16 is substantially H-shaped, with four legs 42 and a central transverse member 44 connecting the legs. As can be seen here and in FIG. 1, one or more apertures 46 are provided in some of links 16, through which an elongate member 14 extends. Links 16 may also include one or more recesses 48 into which an end of an elongate member extends. As illustrated here, recess 48 may consist of an elongate portion 50 in communication with an exterior of link 16 and a chamber 52 connected to elongate portion 50. Chamber 52 is formed as link 16 is molded about elongate member 14, and therefore has a shape mating that at the end of the corresponding elongate member 14 received in recess 48. As illustrated here, chamber 52 has a generally spherical shape, which allows rotational pivoting in ball and socket fashion.

Since the first and second polymers are not bonded to one another, links 16 are free to move along and/or pivot about elongate members 14. Thus, after upper 10 has been formed, links 16 can be moved along frame 12 to a desired position in instances where elongate members 14 extend through an aperture 46.

Figure 5:
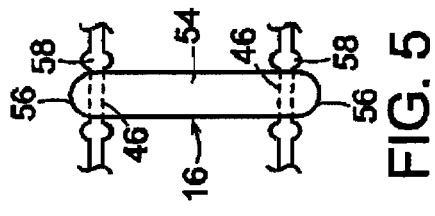
FIG. 5 is a plan view of yet another embodiment of a link of the upper of FIG. 1, shown in connection with elongate members of the frame of the upper.
Figure 4:
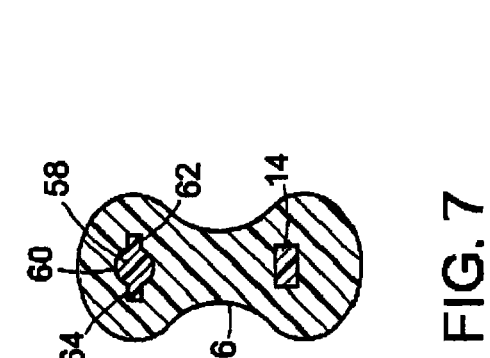
FIG. 4 is a plan view of another embodiment of a link of the upper of FIG. 1, shown in connection with elongate members of the frame of the upper.

An additional shape for a link 16 is shown in FIG. 4, in which link 16 is toroidal, or doughnut shaped. Yet another shape for a link 16 is shown in FIG. 5, in which link 16 has a cylindrical body 54 with hemispherical ends 56. It is to be appreciated that many other shapes will be suitable for link 16, and other suitable shapes will become readily apparent to those skilled in the art, given the benefit of this disclosure.

Figure 6:
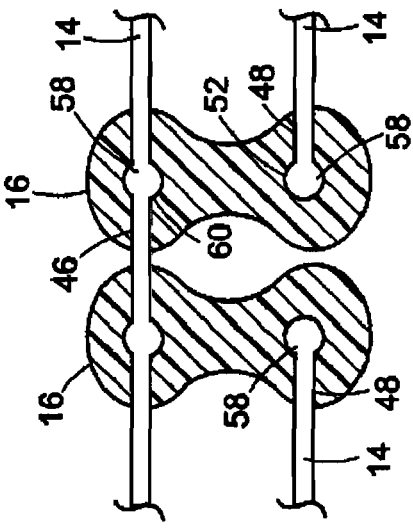
FIG. 6 is a section view of a further embodiment of a link of the upper of FIG. 1, shown in connection with elongate members of the frame of the upper.

In certain preferred embodiments, a plurality of nodules or nubs 58 are provided on elongate members 14, as can be seen in FIGS. 1, 4-6. Nubs 58 serve as positioning elements or locators for links 16, helping to temporarily secure links 16 in a desired position along elongate members 14. In certain preferred embodiments, links are positioned adjacent nubs 58 in an abutting relationship, as seen in FIGS. 4-5. In other preferred embodiments, as illustrated in FIG. 6, nubs 58 are positioned within chamber 52 of a recess 48 formed in link 16 with elongate member 14 extending outwardly from link 16 in one direction. In other preferred embodiments, nubs 58 are positioned within a chamber 60 formed in an aperture 46, with elongate member 14 extending through link 16 in both directions from chamber 60. Chamber 60 is formed as link 16 is molded about elongate member 14, and, therefore, has a shape mating that of nub 58. As illustrated here, nubs 58 and chambers 60 are substantially spherical. It is to be appreciated that nubs 58 and chambers 60 can have any desired shape.

Figure 7:
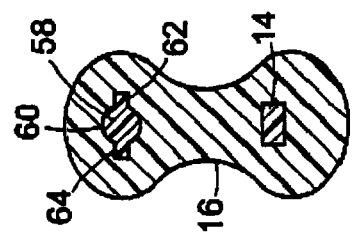
FIG. 7 is a section view of yet a further embodiment of a link of the upper of FIG. 1.

Another preferred embodiment of a nub 58 and corresponding chamber 60 is seen in FIG. 7, in which nub 58 includes flanges 62 extending outwardly from nub 58. Accordingly, chamber 60 includes recesses 64 that mate with and receive flanges 62. The engagement of flanges 62 within recesses 64 prevents rotation of link 16 with respect to elongate member 14, which may be desirable in certain constructions. As seen here, flanges 62 and recesses 64 are substantially rectangular in cross-section. It is to be appreciated that flanges 62 and recesses can have any desired shape. In other preferred embodiments, also illustrated in FIG. 7, an elongate member 14 may have a rectangular profile, which also prevents rotation of link 16 with respect to elongate member 14. It is to be appreciated that elongate members 14 may have any desired profile.

Figure 8:
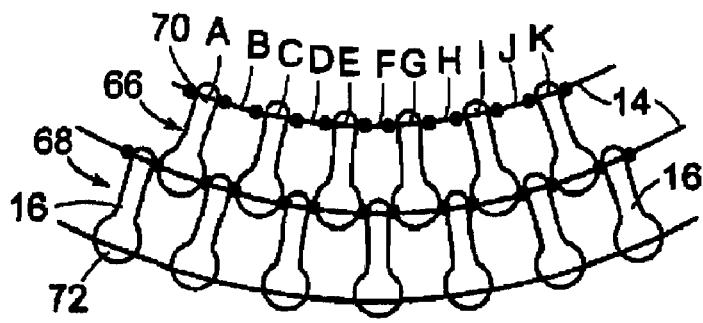
FIG. 8 is a plan view of a portion of the upper of FIG. 1, showing a plurality of links on the frame in a first position.
Figure 9:
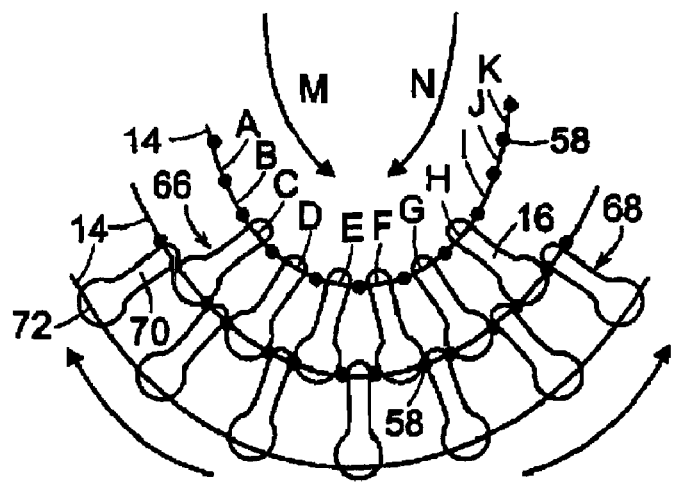
FIG. 9 is a plan view of the links and frame of FIG. 8 shown in a second position.

As noted above, links 16 may move along respective elongate members 14, allowing complex shapes to be formed. An example of altering the shape of upper 10 is illustrated in FIGS. 8-9, in which the movement of a plurality of links 16 along elongate members 14 with a "drawstring" effect can be seen. FIG. 8 illustrates an initial configuration with three elongate members 14 and an upper row 66 and a lower row 68 of links 16 connected to adjacent elongate members 14. The links 16 illustrated here have an elongate portion 70 and a bulbous end portion 72. An elongate member 14 extends through an end of each elongate portion 70 and through each end portion 72.

In the initial configuration a first radius for elongate members 14 provides a slight curve to elongate members 14. As can be seen in the uppermost elongate member 14, the lengths of the uppermost elongate member 14 between adjacent nubs 58 has been labeled A-K. In this initial configuration, a pair of nubs 58 and a corresponding length of elongate member is positioned between each elongate portion 70 along the uppermost elongate member 14, with each elongate portion 70 positioned along a particular length of elongate member 14. Thus, elongate portions 70 are positioned along lengths A, C, E, G, I and K, with lengths B, D, F, H and J, along with corresponding pairs of nubs 58 positioned adjacent elongate portions 66. Thus for the six elongate portions 66, eleven lengths A-K are required.

A plurality of nubs 58 are provide along the central elongate member 14, with each nub 58 abutting an end portion 72 from upper row 66 of links 16 and an elongate portion 70 from lower row 68 of links 16. No nubs 58 are provided along the lowermost elongate member 14 in this embodiment. As can be seen here, each link 16 in upper row 66 and lower row 68 has a first narrow end and a second wider end. The narrow end is connected to the elongate member 14 that has a radius that is smaller than the radius of the elongate member 14 to which the wider end is connected.

In FIG. 9, the "drawstring" effect can be seen, where elongate portions 70 of upper row 66 of links 16 have been compressed together such that they are separated from one another solely by a nub 58. Thus, elongate portions 70 have been moved inwardly along the upper elongate member 14 toward one another in the direction of arrows M and N, with elongate portions now positioned along lengths C, D, E, F, G, and H. End portions 72 on the lower row 68 of links 68 are now spaced from one another a greater distance, with elongate members 14 now being curved to a much greater extent to accommodate the fanning out of links 16. In this configuration, elongate members 14 have a second radius than the first radius seen in FIG. 8. This construction is one way to cause previously flat portion of footwear 11 to spring into a three-dimensional shape. This and other configurations of links 16 and elongate members 14 advantageously allow the flat-formed elements to pop into a three-dimensional shape during lasting.

Figure 10:
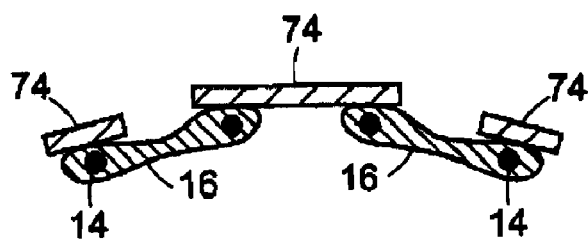
FIG. 10 is an alternative embodiment of the upper of FIG. 1, showing a plurality of plates secured to the links.
Figure 11:
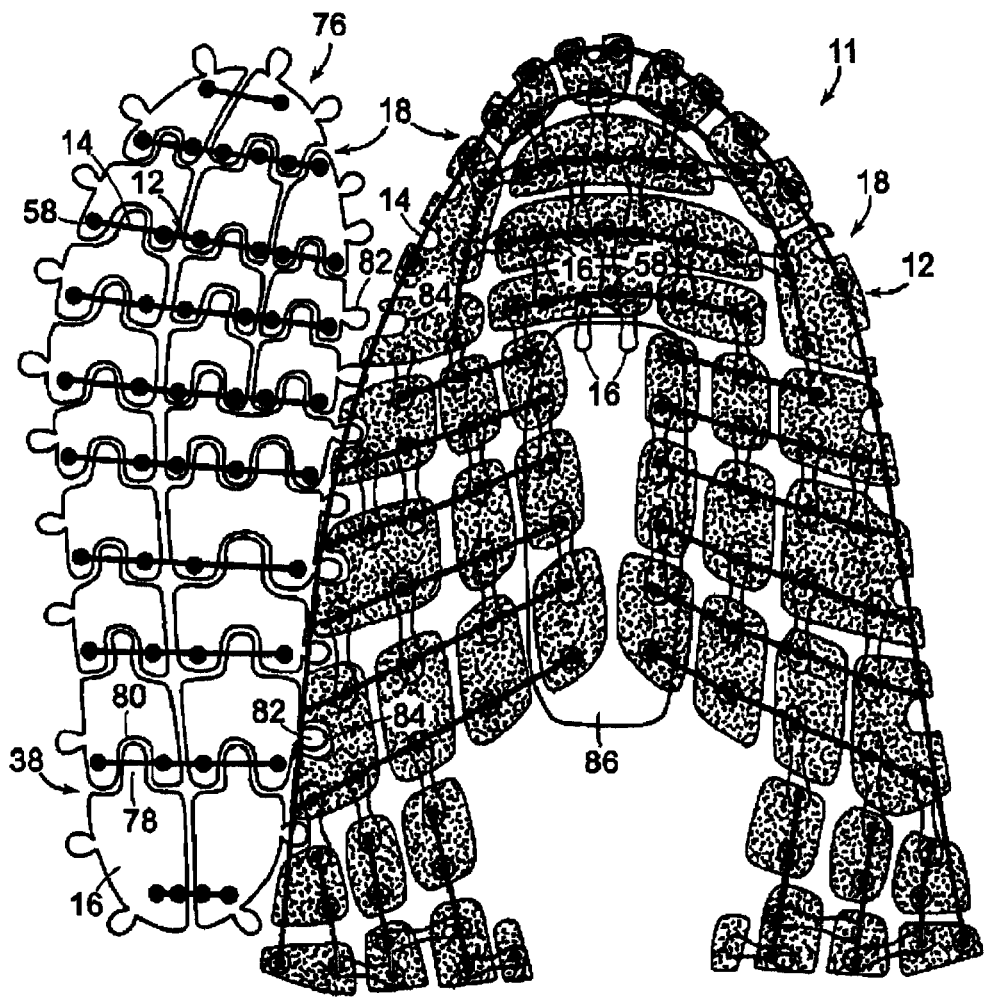
FIG. 11 is a plan view of an article of footwear in accordance with another preferred embodiment of the present invention, showing an upper formed of links on a frame with plates secured to the links, and a sole assembly formed of a plurality of links on a frame.

In certain preferred embodiments, as seen in FIG. 10-11, a plurality of plates 74 may be secured to article of footwear 11, with plates 74 shown here being secured to links 16. In a preferred embodiment, plates 74 are formed of a soft material, providing padding and comfort for the user. Plates 74 may be secured to the interior of footwear 11, providing comfort where the user's foot comes in contact with footwear 11. In other embodiments, plates 74 may be secured to the exterior of footwear 11, providing protection for links 16 and elongate members 14 from the elements and from wear. In a preferred embodiment, plates 74 are formed of a non-woven textile, such as a felt material, which will not fray. Plates 74 may be secured to links 16 by an adhesive, for example, or by welding such as RF welding, laser welding, or by heat press. It can be appreciated that plates 74 can naturally move along frame 12 with links 16. As seen in FIG. 10, each plate 74 may be secured to a single link 16 at single or multiple points, or it may span and be secured to two or more links 16, providing greater coverage over a portion of footwear 11.

Figure 12:
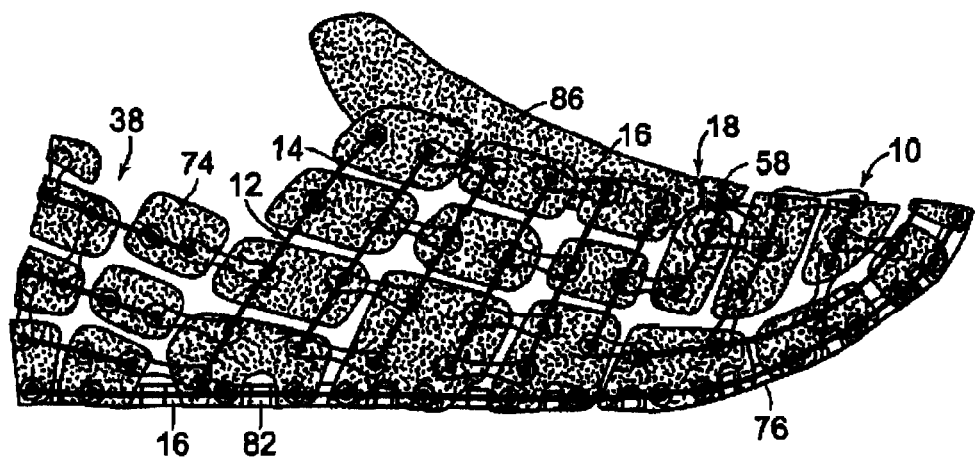
FIG. 12 is a side elevation view of the article of footwear of FIG. 11.

As seen in FIGS. 11-12, and as noted above, a sole assembly 76 of footwear 11 is formed of a plurality of links 16 on a frame 12. The elongate members 14 of frame 12 may be substantially parallel to one another and extend transversely across sole assembly 76. In a preferred embodiment, one or more of links 16 of sole assembly 76 include one or more tabs 78 that are nested and received in corresponding recesses 80 formed in adjacent links 16. Respective elongate members 14 extend through tabs 78 and the adjacent links 16, providing pivoting between adjacent links 16 and flexibility for sole assembly 76. In the illustrated embodiment, the nubs 58 on elongate members 14 are received within chambers 52, 60 formed in recesses 48 and apertures 46, respectively, in links 16 (not shown here), as discussed above with respect to FIG. 6.

In the illustrated embodiment, peripheral links 16 of sole assembly 76 include tabs 82 that are received in corresponding recesses 84 formed in corresponding plates 74 of upper 10. Alternatively, tabs 82 could be received in recesses formed in links 16 of upper 10. Alternatively, sole assembly 76 could include links 16 that serve as flanges and which could include tabs 33, 37 similar to those described above in connection with FIG. 1. Such tabs 33, 37 could be secured to the tabs 33, 37 of upper 10 by stitching, adhesive or other suitable fastening or bonding means.

A tongue 86 is secured to upper 10. In a preferred embodiment, a pair of links 16 in a vamp of forefoot region 18 is used to secure tongue 86 to upper 10. It is to be appreciated that tongue 86 can be secured to upper 10 in many ways, including the use of Y-shape links as seen in the vamp area of forefoot region 18 of the upper shown in FIG. 1. Other suitable means for securing tongue 86 to upper 10 will become readily apparent to those skilled in the art, given the benefit of this disclosure.

Figure 13:
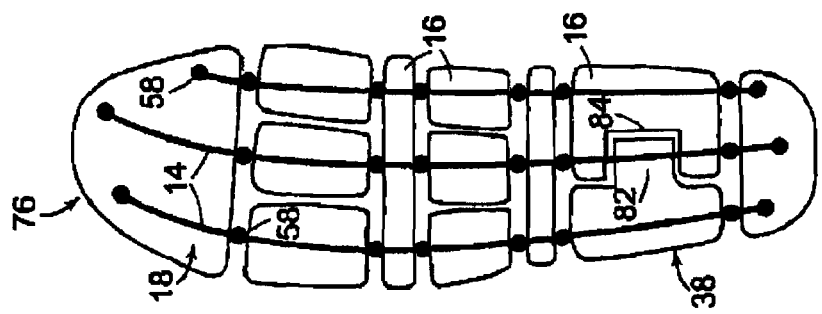
FIG. 13 is a plan view of an alternative embodiment of the sole assembly of FIG. 11.

It is to be appreciated that sole assembly 76 can have many different configurations. As seen in FIG. 13, sole assembly 76 has a plurality of elongate members 14 extending substantially longitudinally along footwear 11 and substantially parallel to one another. Links 16 of this embodiment have various shapes. As illustrated here, certain links 16 span the width of sole assembly 76, which maintain elongate members 14 in a spaced relationship and fix them with respect to one another. Between the links 16 that span the width of sole assembly 76, multiple links 16 are combined to span the width of sole assembly 76. As illustrated here, sole assembly 76 has three elongate members 14. Thus, in certain positions three links 16 are positioned across sole assembly 76, with each of those links molded about a single elongate member 14. In a heel region 38 of sole assembly 76, a pair of links 16 is used to span sole assembly 76, with each of the pair molded about an outermost elongate member 14 and the central elongate member 14. A tab 82 on one of the pair of links is received in a recess 84 of the adjacent link 16, such that these links pivot with respect to one another about the central elongate member 14. Certain nubs 58 are positioned within links 16, while other nubs 58 are positioned between adjacent links 16 along elongate members 14 to maintain proper spacing of links 16.

Figure 14:
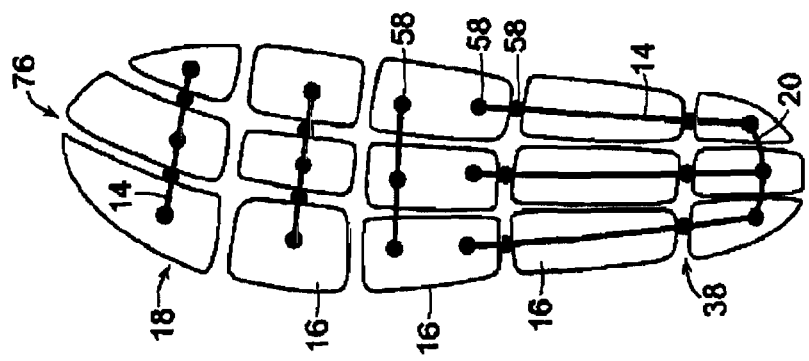
FIG. 14 is a plan view of another alternative embodiment of the sole assembly of FIG. 11.

Another embodiment of sole assembly 76 is shown in FIG. 14, in which links 16 in a forefoot region 18 include elongate members 14 that extend substantially transversely across sole assembly 76. As illustrated here, there are three sets of three links 16 in forefoot region 18, with each set secured to an elongate member 14. Two sets of three links 16 are positioned in heel region 38 of sole assembly 76, with each set extending about one of three elongate members 14 that extend longitudinally along sole assembly 76. Elongate transverse members 20 connect ends of the three elongate members 14 in heel region 38, helping to maintain elongate members 14 in a fixed spaced relationship with respect to one another.

Figure 15:
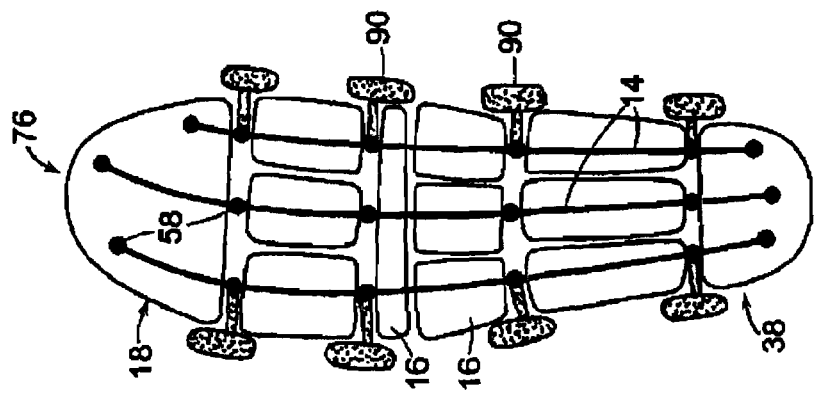
FIG. 15 is a plan view of a further alternative embodiment of the sole assembly of FIG. 11.

Yet another embodiment of sole assembly 76 is shown in FIG. 15, in which each of a plurality of elongate members 14 extends substantially longitudinally along footwear 11 and substantially parallel to one another. As illustrated here, three elongate members 14 extend along sole assembly 76. Extending transversely out from the outermost elongate members 14 are a plurality of attachment tabs 90. Attachment tabs 90 provide a convenient point for securing sole assembly 76 to upper 10 as seen in FIG. 16, in which attachment tabs 90 are secured to a conventional upper 10 by stitching, adhesive, welding, or any other suitable fastening means. In a preferred embodiment, attachment tabs 90 are of unitary, that is, one-piece construction with elongate members 14. Such a construction may ease injection flow and provide increased strength for anchoring sole assembly 76 to upper 10. As seen here, certain links 16 span across the entire width of sole assembly 76, while in other areas, three links 16 are positioned adjacent to one another across the width of sole assembly 76 with each of the three links molded to a single elongate member 14.

It is to be appreciated that an upper 10 formed of elongate members 14 and links 16 can be combined with a conventional sole assembly 76, and vice versa. As seen in FIG. 17, attachment tabs 90 are provided on elongate members 14 of upper 10 and are secured to links 16 of sole assembly 76 by stitching, adhesive, welding, or any other suitable fastening means.

As seen in FIG. 18, links 16 of upper 10 are secured by stitching, adhesive, RF welding or other suitable fastening means to a stroebel sock 92 of a conventional sole assembly 76. It is to be appreciated that an attachment tab 90 could be used in this or any other embodiment to secure upper 10 to sole assembly 76.

As seen in FIG. 19, a conventional upper 10 is directly secured to links 16, by adhesive, RF welding or other suitable fastening means.

Figure 21:
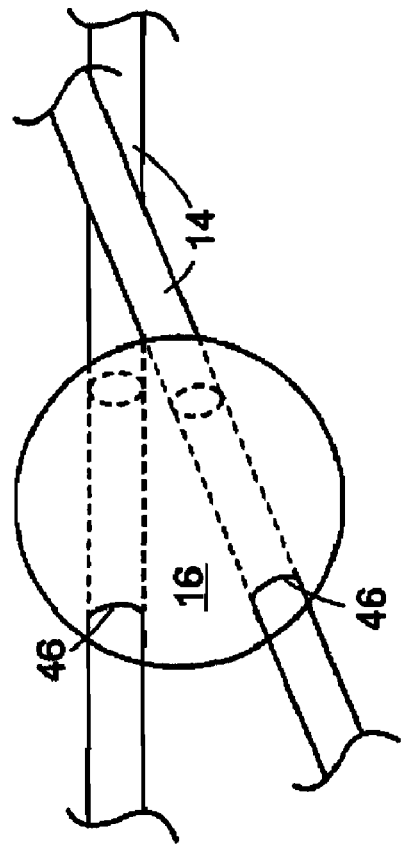
FIG. 21 is a perspective view of the link of FIG. 20, shown with two elongate members extending therethrough.
Figure 20:
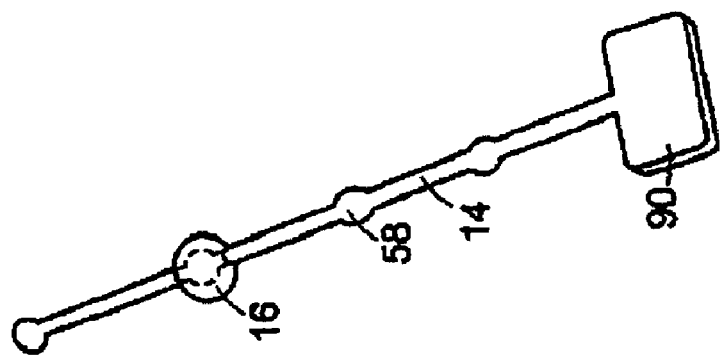
FIG. 20 is a perspective view of an alternative embodiment of a link of the upper of FIG. 1, shown in connection with an elongate member of the frame of the upper.

Another preferred embodiment of a link 16 is shown in FIG. 20, in which link 16 comprises a spherical member, which encompasses or surrounds a nub 58. An alternative embodiment of a spherical link 16 is seen in FIG. 21, in which two elongate members 14 protrude through apertures 46 in link 16. As illustrated here, elongate members 14 extend through link 16 at an angle with respect to one another. It is to be appreciated that elongate members 14 can be parallel to one another, or be positioned at any angle with respect to one another.

Figure 22:
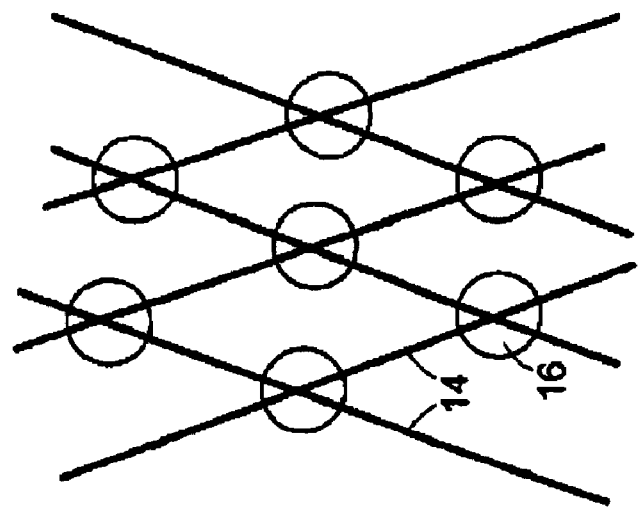
FIG. 22 is a plan view of an alternative embodiment of a portion of the upper of FIG. 1, shown using the links of FIG. 20 and a plurality of elongate members.

A portion of upper 10 utilizing elongate members 14 that extend through spherically shaped links 16 at an angle with respect to one another to create a mesh pattern is shown in FIG. 22. It is to be appreciated that in certain preferred embodiments the elongate members 14 can be formed of different polymers and, therefore, will have different properties providing varied effects across upper 10. For example, upper 10 could have differential stretch in different directions.

Figure 23:
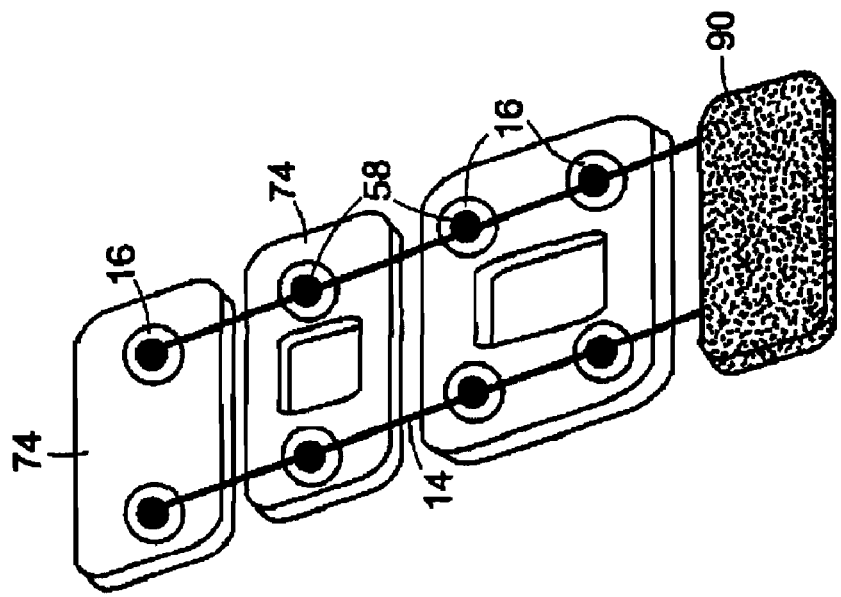
FIG. 23 is a perspective view of an alternative embodiment of the links and elongate members of the upper of FIG. 1, shown in connection with a plurality of plates.

An alternative embodiment is shown in FIG. 23, in which ends of a pair of elongate members 14 share an attachment pad 90, which may be secured to another portion of footwear 11. Plates 74 are secured to links 16, which are illustrated here as spherically shaped links 16. In certain embodiments, plates 74 may include an aperture 94, which serves to reduce the weight of plates 74 and can provide ventilation for footwear 11. As seen here, each elongate member 14 can be secured to a corresponding plate by a single link 16 secured to a plate 74, or by multiple links 16 secured to the plate 74.

Figure 24:
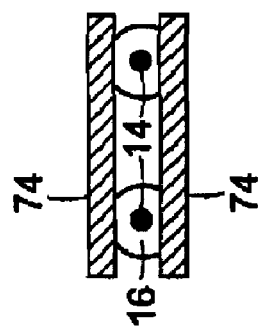
FIG. 24 is an alternative embodiment of the upper of FIG. 1, showing a plurality of plates secured to interior and exterior sides of the links.

As noted above, plates 74 can be secured to an exterior or interior surface of a portion of footwear 11. As seen in FIG. 24, plates 74 may be secured to both an interior and exterior surface of a portion of footwear 11. Each of the plates 74 may be formed of the same material, or may be formed of different materials to serve different functions. For example, the plate 74 secured to an exterior surface of footwear 11 could be formed of a waterproof material, while the plate 74 secured to an interior surface of footwear 11 could be formed of a soft material to provide comfort for the user's foot.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. An article of footwear comprising, in combination:
   a frame comprising a plurality of elongate members formed of a first polymer, each elongate member having a longitudinal axis, at least one of the elongate members including a plurality of nubs spaced from one another along the one of the elongate members; and
   a plurality of links formed of a second polymer, a portion of each link co-molded about a portion of at least one elongate member, at least one entire link free to one of pivot about and slide along the longitudinal axis of a corresponding elongate member.

2. The article of footwear of claim 1, wherein at least one link is free to pivot about and slide along an elongate member.

3. The article of footwear of claim 1, wherein at least one link has at least one aperture, one of the elongate members extending through each aperture, the link being pivotable about and slidable along the one of the elongate members.

4. The article of footwear of claim 3, wherein at least one of the elongate members and corresponding aperture have a circular cross-section.

5. The article of footwear of claim 3, wherein at least one of the elongate members and the corresponding aperture have a rectangular cross-section.

6. The article of footwear of claim 1, wherein at least one link includes a recess, an end of one of the elongate members being received in each recess.

7. The article of footwear of claim 1, wherein at least one nub is substantially spherical.

8. The article of footwear of claim 1, wherein at least one link has at least one aperture, one of the elongate members extending through each aperture, the link being pivotable about and slidable along the one of the elongate members.

9. The article of footwear of claim 8, wherein at least one aperture has a chamber formed therein, a nub being positioned in the chamber.

10. The article of footwear of claim 9, further comprising at least one recess extending outwardly from at least one chamber and at least one flange on at least one of the elongate members, each flange being received in a corresponding recess.

11. The article of footwear of claim 1, wherein at least one link has at least one recess, an end of one of the elongate members being received in each recess.

12. The article of footwear of claim 11, wherein at least one recess has a chamber formed therein, a nub being formed at an end of one of the elongate members and received in the chamber.

13. The article of footwear of claim 1, wherein at least one link is positioned along one of the elongate members between adjacent nubs, the nubs restricting movement of the link along the one of the elongate members.

14. The article of footwear of claim 1, wherein a plurality of nubs is positioned on one of the elongate members between adjacent links.

15. The article of footwear of claim 1, wherein at least one link is substantially Y shaped, with an aperture formed proximate an end of each arm of the Y shape and proximate an end of a base of the Y shape, one of the elongate members extending through each aperture.

16. The article of footwear of claim 1, wherein at least one link is substantially oval, with an aperture formed proximate each end of the oval shape, one of the elongate members extending through each aperture.

17. The article of footwear of claim 16, wherein at least one oval shaped link includes an extension member at each end of the oval shape, the apertures being formed proximate an exposed end of each of the extension members.

18. The article of footwear of claim 16, wherein at least one oval shaped link includes a central aperture formed therein.

19. The article of footwear of claim 1, wherein at least one link is substantially H shaped.

20. The article of footwear of claim 19, wherein an aperture is formed proximate an end of at least one leg of the H shape, one of the elongate members extending through each aperture.

21. The article of footwear of claim 19, wherein a recess is formed proximate an end of at least one leg of the H shape, an end of one of the elongate members being received in each recess.

22. The article of footwear of claim 1, wherein at least one link has a first end with a substantially circular cross-section, a second end with a substantially circular cross-section, and a reduced thickness portion joining the first and second ends.

23. The article of footwear of claim 1, wherein at least one link is substantially cylindrical with substantially hemispherical ends.

24. The article of footwear of claim 1, wherein a portion of the frame comprises a plurality of the plurality of elongate members spaced from and substantially parallel to one another.

25. The article of footwear of claim 24, wherein the plurality of the plurality of elongate members of the portion of the frame are curved.

26. The article of footwear of claim 1, wherein ends of adjacent ones of the elongate members of the frame are connected to one another with elongate transverse members formed of the first polymer.

27. The article of footwear of claim 26, wherein the elongate members and elongate transverse members are of unitary construction.

28. The article of footwear of claim 1, wherein at least one of the elongate members is curved.

29. The article of footwear of claim 1, further comprising a plurality of plates, each plate being secured to at least one link.

30. The article of footwear of claim 29, wherein the plates form an interior surface of the article of footwear.

31. The article of footwear of claim 29, wherein the plates form an exterior surface of the article of footwear.

32. The article of footwear of claim 29, wherein the plates form an exterior surface and an interior surface of the article of footwear.

33. The article of footwear of claim 29, wherein the plates are formed of a non-woven textile.

34. The article of footwear of claim 29, wherein the plates are formed of a polymer.

35. The article of footwear of claim 29, wherein at least one plate is secured to a link in multiple locations.

36. The article of footwear of claim 29, wherein at least one plate includes an aperture.

37. The article of footwear of claim 1, wherein the first polymer is a polyamide.

38. The article of footwear of claim 1, wherein the second polymer is polyester.

39. The article of footwear of claim 1, wherein at least one link includes a tab and at least one link includes a recess, each recess receiving a tab of an adjacent link.

40. The article of footwear of claim 1, further comprising an upper and a sole assembly formed from the frame and plurality of links, the upper being secured to the sole assembly.

41. The article of footwear of claim 40, wherein a plurality of links of the upper include a flange and a plurality of links of the sole assembly include a flange, each flange of the upper secured to a corresponding flange of the sole assembly.

42. The article of footwear of claim 40, further comprising a fastener secured to a heel region of the upper, the fastener configured to secure a lateral portion of the upper to a medial portion of the upper.

43. The article of footwear of claim 40, wherein a plurality of links of the upper include an aperture extending therethrough to form an attachment point for a fastener.

44. The article of footwear of claim 1, wherein the first and second polymers are capable of being co-molded without bonding to one another.

45. The article of footwear of claim 1, further comprising at least one attachment tab, each attachment tab formed on an elongate member.

46. An article of footwear comprising, in combination:
   a frame comprising a plurality of elongate members formed of a first polymer, at least one elongate member including a plurality of nubs spaced from one another along the elongate member; and
   a plurality of links formed of a second polymer, the links movable with respect to the elongate members, a portion of each link co-molded about a portion of at least one elongate member, at least one link including a recess with an end of an elongate member being received in each recess, at least one link including an aperture with an elongate member extending through each aperture.

47. The article of footwear of claim 46, wherein at least one aperture has a chamber formed therein, a nub being positioned in the chamber.

48. The article of footwear of claim 46, wherein at least one recess has a chamber formed therein, a nub being formed at an end of one of the elongate members and received in the chamber.

49. The article of footwear of claim 46, further comprising a plurality of plates, each plate being secured to at least one link.

50. The article of footwear of claim 46, wherein the plates form an interior surface of the article of footwear.

51. The article of footwear of claim 46, wherein the plates form an exterior surface of the article of footwear.

52. The article of footwear of claim 46, wherein the plates are formed of a non-woven textile.

53. An article of footwear comprising, in combination:
   a frame comprising a plurality of elongate members formed of a first material, each elongate member having a longitudinal axis, at least one of the elongate members including a plurality of nubs spaced from one another along the one of the elongate members; and
   a plurality of links formed of a second material, the first and second materials are capable of being co-molded without bonding to one another, a portion of each link co-molded about a portion of at least one elongate member, at least one entire link being free to one of pivot about and slide along the longitudinal axis of a corresponding elongate member about which it is co-molded.

54. The article of footwear of claim 53, wherein the links and frame are configured to be co-molded in a flat configuration and popped into a three dimensional shape during lasting.

55. The article of footwear of claim 53, wherein a plurality of the elongate members are curved and substantially parallel to one another with links extending between adjacent elongate members, a plurality of the links having a narrow end and a wider end, each narrow end connected to an elongate member having a radius smaller than a radius of an elongate member to which the wider end is connected.

56. The article of footwear of claim 55, wherein the plurality of links having a narrow end and a wider end are substantially Y-shaped.

57. The article of footwear of claim 55, wherein each of the plurality of curved elongate members have an first radius and a second smaller radius created by moving the narrow ends of the plurality of links closer together along the elongate member to which they are attached.

58. The article of footwear of claim 55, wherein the links are formed of two compatible polymers.

59. The article of footwear of claim 53, wherein the elongate members are formed of two compatible polymers.

* * * * *